(12) United States Patent
Adler et al.

(10) Patent No.: US 7,293,407 B2
(45) Date of Patent: Nov. 13, 2007

(54) METHOD FOR OPERATING A DIESEL ENGINE

(75) Inventors: Holger Adler, Stuttgart (DE); Klaus Allmendinger, Bachhagel (DE); Dirk Becker, Bruchsal (DE); Oliver Erlenmayer, Pforzheim (DE); Andreas Hasert, Remshalden (DE); Hans-Hubert Hemberger, Notzingen (DE); Anton Kerckhoff, Stuttgart (DE); Stefan Kurze, Markgroeningen (DE); Michael Lenz, Fellbach (DE); Thomas Liebscher, Fellbach (DE); Ulrich Merten, Le-Echterdingen (DE); Andreas Roll, Esslingen (DE); Norbert Ruzicka, Steinenbronn (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/311,881

(22) PCT Filed: Jun. 15, 2001

(86) PCT No.: PCT/EP01/06796

§ 371 (c)(1),
(2), (4) Date: Jun. 2, 2003

(87) PCT Pub. No.: WO01/98645

PCT Pub. Date: Dec. 27, 2001

(65) Prior Publication Data

US 2003/0182934 A1    Oct. 2, 2003

(30) Foreign Application Priority Data

Jun. 21, 2000  (DE) ................................. 100 29 504

(51) Int. Cl.
*F01N 3/00* (2006.01)

(52) U.S. Cl. ............................ 60/286; 60/274; 60/285; 60/278; 60/295; 60/297

(58) Field of Classification Search .................. 60/274, 60/285, 286, 295, 297, 303, 311, 278; 123/295, 123/299, 300, 305
See application file for complete search history.

(56) References Cited

U.S. PATENT DOCUMENTS 5,732,554 A * 3/1998 Sasaki et al. .................. 60/278
5,826,425 A * 10/1998 Rossi Sebastiano et al. .. 60/274
5,839,275 A * 11/1998 Hirota et al. .................. 60/285

(Continued)

FOREIGN PATENT DOCUMENTS

DE    196 22 832 A1    12/1996

(Continued)

*Primary Examiner*—Tu M. Nguyen
(74) *Attorney, Agent, or Firm*—Crowell & Moring LLP

(57) ABSTRACT

The invention relates to a method for operating a diesel engine in which an air ratio (λ) of the fuel which is to be burnt and of the combustion air supplied is set by a control unit (14) according to predetermined values. When a value (15) which is predetermined as a switching criterion is recorded, the control unit (14) switches to a special operating mode for regeneration of a catalytic converter (22) and sets the fuel/air ratio according to predetermined values for this operating mode.

To achieve more effective regeneration of the catalytic converter, according to the invention it is provided that at least one afterinjection, which is separated in time from a main injection, of fuel which is also to be burnt takes place in the special operating mode.

24 Claims, 2 Drawing Sheets

U.S. PATENT DOCUMENTS

| | | | |
|---|---|---|---|
| 6,014,859 A * | 1/2000 | Yoshizaki et al. | 60/285 |
| 6,041,591 A * | 3/2000 | Kaneko et al. | 60/274 |
| 6,082,325 A * | 7/2000 | Digeser et al. | 123/299 |
| 6,209,316 B1 | 4/2001 | Duvinage et al. | |
| 6,269,791 B1 * | 8/2001 | Tanaka et al. | 123/300 |
| 6,370,869 B1 * | 4/2002 | Hirota et al. | 60/276 |
| 6,397,820 B1 * | 6/2002 | Novak et al. | 123/480 |
| 6,412,276 B1 * | 7/2002 | Salvat et al. | 60/295 |
| 6,491,016 B1 * | 12/2002 | Buratti | 123/299 |
| 6,594,990 B2 * | 7/2003 | Kuenstler et al. | 60/295 |
| 6,644,020 B2 * | 11/2003 | Kuenstler et al. | 60/286 |
| 6,666,019 B2 * | 12/2003 | Kawatani et al. | 60/286 |
| 6,668,548 B1 * | 12/2003 | Asanuma et al. | 60/286 |
| 6,901,747 B2 * | 6/2005 | Tashiro et al. | 60/286 |
| 2003/0070425 A1 * | 4/2003 | Kokusyo et al. | 60/295 |

FOREIGN PATENT DOCUMENTS

| | | |
|---|---|---|
| DE | 197 50 226 C1 | 10/1998 |
| DE | 197 53 718 C1 | 7/1999 |
| DE | 199 39 988 A1 | 3/2001 |
| EP | 0 732 485 A2 | 9/1996 |
| EP | 0 831 226 A2 | 3/1998 |
| EP | 1 077 319 A2 | 2/2001 |
| WO | WO 200068554 A1 * | 11/2000 |

* cited by examiner

METHOD FOR OPERATING A DIESEL ENGINE

The invention relates to a method for operating a diesel engine.

BACKGROUND AND SUMMARY OF THE INVENTION

Conventional methods set an air ratio of the fuel and of the combustion air supplied separately according to predetermined values for the operating state of the engine. The actuators provided for this purpose are acted on by a control unit. The control unit determines the quantity of the fuel, leading to the desired operating load of the diesel engine. Often, a substoichiometric fuel/air ratio is set, and the diesel engine is to this extent operated with a lean mix. A set value for an operating variable of the diesel engine is predetermined in the control unit as a criterion for switching to a special operating mode. At this set value, a defined fuel/air ratio is set according to stipulated values for this special operating mode. This may be the case, for example, if there is a device for exhaust-gas aftertreatment, such as a storage catalytic converter, which is desorbed periodically. For this purpose, the special operating mode creates the required desorption atmosphere by setting the fuel/air ratio. DE 197 53 718 C1 discloses such a method, which evaluates certain criteria in order to switch between two different combustion processes. When the switching criterion is recorded, the engine is switched to the special operating mode in order to regenerate a storage catalytic converter.

DE 199 39 988 A1 also discloses a method which switches to a special operating mode of the diesel engine when a defined switching criterion is present to regenerate a storage catalytic converter with regard to the nitrogen oxide salts. For this purpose, in the regeneration mode, an exhaust gas which has a reducing action on the catalytic converter is generated in the special operating mode.

DE 197 50 226 C1 discloses an engine control system which controls the operation of a diesel engine as a function of characteristic diagrams. In this case, separate characteristic diagrams for an operating mode with lean combustion and an operating mode with fuel-rich combustion are stored in an engine management unit. The duration of the regeneration of the device for exhaust-gas aftertreatment is very long in the known methods. Also, the driver of a motor vehicle driven by the engine can often feel the switching to the special operating mode and back, which is undesirable.

It is an object of the present invention to provide a method for operating a diesel engine, in which the operating conditions are improved in the special operating mode.

According to the invention, in the special operating mode, there is at least one afterinjection of fuel, which is separated in time from the main injection. The time of the afterinjection is set so late in the cycle that the fuel injected in the afterinjection is burnt together with the fuel which is already burning. In this way, an exhaust gas with a high temperature and enthalpy is formed. And it is possible both to promote the regeneration of particle filters, in which superstoichiometric operation is provided for, and to achieve efficient sulphur regeneration of NOx storage catalytic converters in substoichiometric mode. The method according to the invention creates exhaust gases which have a reducing action on catalytic converter surfaces both during superstoichiometric combustion, i.e. with a rich fuel/air mix, and during substoichiometric combustion with a lean fuel/air mix. The fuel is introduced in a plurality of partial injections.

For example, the fuel, which is delivered prior to the afterinjection which also burns, can be metered to a plurality of main injections or also any desired number of preinjections. The afterinjection quantity which burns as well can advantageously also be metered in a plurality of afterinjections.

It is particularly advantageous for the fuel in the afterinjection which is also burnt to be metered according to the operating state of the engine, so that ultimately the operating load of the engine is established by setting the afterinjection quantity. It is expediently also possible for the injection time of the afterinjection to be set by the control unit according to the operating state. The partial injections which take place before the afterinjection which is also burnt, with an early combustion position, represent a shaping of the injection profile at which the afterinjection can be matched to the engine operation in terms of quantity and type.

In an advantageous configuration of the invention, when switching into the special operating mode and back, the control unit increases the quantity of fuel in the afterinjection which is also burnt while, at the same time, reducing the main injection quantity of subsequent cycles by a corresponding amount, until the intended afterinjection quantity is reached. Accordingly, when switching back to the standard operating state, the afterinjection quantity is reduced with a corresponding increase in the main injection quantity. It is thereby possible to produce a transition from the formation of a lean mix with fuel/air ratios $\lambda<1$ to fuel-rich combustion with fuel/air ratios $\lambda>1$. The transition from lean to rich combustion during the switching phase can be carried out with continuously or discontinuously varied quantities in the main injection and the matched afterinjection which is also burnt. An indexed torque of the diesel engine, which is kept constant during the switching phase, is used as a control variable for the change in the injection quantities. In this way, the switching or switching back of the operating states takes place without any jerking whatsoever and cannot be felt by the driver of a motor vehicle.

In order, in the special operating mode, to create the exhaust-gas composition which is required for regeneration of a catalytic converter, it may be expedient to add fuel to the exhaust gas. The added fuel is cracked in the exhaust-gas atmosphere, and the hydrocarbon radicals formed contribute to a reduction in the exhaust-gas emissions from the diesel engine. Fuel may be added with one or more additional afterinjections which take place following the afterinjections which are also burnt in accordance with the invention. However, it is optionally also possible to provide an injection of fuel into the exhaust pipe of the diesel engine, which can be metered independently of the engine operation in terms of quantity and time.

The method according to the invention makes it possible to increase the efficiency of the regeneration of NOx adsorber systems, which under certain conditions (storage capacity, active temperature window) store the nitrogen oxides from internal combustion engines during lean combustion (superstoichiometric combustion with $\lambda>1$ and accordingly residual oxygen in the exhaust gas). The method according to the invention quickly provides oxygen-free exhaust gas ($\lambda<1$) with the maximum possible reducing-agent content, which is required in order to regenerate NOx adsorber systems of this type, i.e. to desorb NOx and, at the same time, convert NOx into nitrogen N2. The afterinjection fuel which is also burnt likewise quickly results in high temperatures in the exhaust gas, which are used to remove deposits of sulphur compounds, which act as a catalyst poison. The high temperatures also allow more rapid regeneration of particle filters. After a cold start, known catalytic converters require a certain time before they reach their starting temperature. The use of the combustion method according to the invention allows this time to be shortened compared to known methods, on account of the significantly higher exhaust-gas temperature, with the result that a considerably lower emission of exhaust gases is achieved while the diesel engine is warming up.

During the setting or controlling of the fuel/air ratio, it is expediently also possible to take account of the quantity of recirculated exhaust gas which is admixed with the fresh air. The control unit drives an exhaust-gas recirculation valve as an actuator of the control arrangement. In a refinement of the invention, the control unit, in addition to setting the injection parameters, also controls the pressure of the fresh air which is supplied, expediently with throttle devices in the intake region and a turbocharging device in the exhaust region of the diesel engine. Alternatively, the pressure control may be effected by the exhaust-gas recirculation valve and the turbocharging device as actuators.

Furthermore, the control unit advantageously controls the mass throughput of fresh air, using the exhaust-gas recirculation valve as actuator in accordance with a measurement signal from an air mass flowmeter. The mass throughput can also be controlled by throttle valves as actuators. In this case, the control unit coordinates all the actuators and continuously tracks the actuating movements as a function of the recorded control deviations from the set value throughout the entire operating range of the diesel engine. The method according to the invention is implemented even in steady operating states of the diesel engine by corresponding preset values on characteristic diagrams. To set a transition which is neutral in terms of load, the air path is continuously adjusted, specifically the induction pipe pressure and the mass flow of fresh air are regulated, before the injection measures are triggered when switching the operating states, i.e. before the injection quantity of fuel in the afterinjection which is also burnt is altered.

The invention is explained in more detail below with reference to an exemplary embodiment.

DETAILED DESCRIPTION OF THE DRAWINGS

Figure 1:
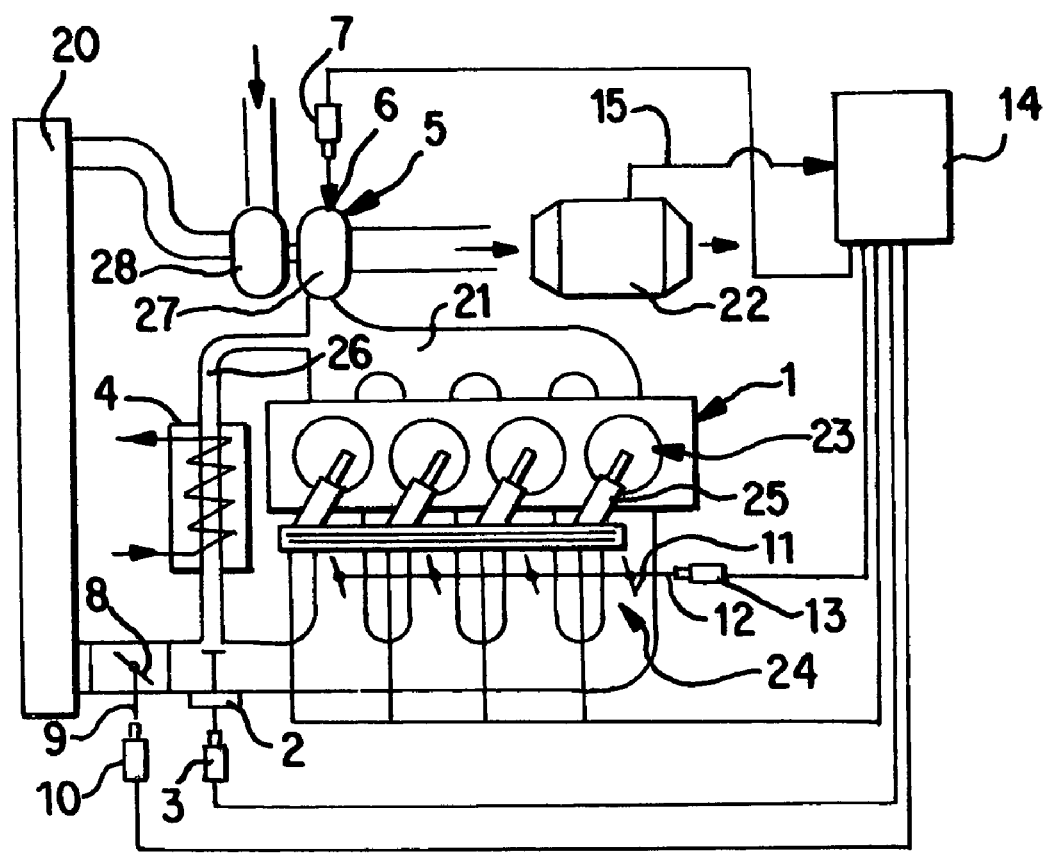
FIG. 1 diagrammatically depicts a diesel engine.

FIG. 1 shows a diesel engine 1 with four cylinders 23, each of which is assigned an injector 25. The injectors 25, which are fed from a common rail, inject fuel directly into the cylinders 23 according to a control signal from a control unit 14, and the fuel is burnt together with combustion air supplied separately. The fresh air is supplied via an intake line 20, to which the cylinders 23 are connected by inlet ports 24. The exhaust gas from all the cylinders 23 is discharged via an exhaust pipe 21 and is passed through a catalytic converter 22 before being released to the environment. The exhaust pipe 21 is connected to the intake air line 20 via an exhaust-gas recirculation line 26. After an exhaust-gas recirculation valve 2 has been opened, exhaust gas from the diesel engine 1 can be admixed with the fresh air, the recirculated exhaust gas being cooled by an exhaust-gas cooler 4 before it flows into the intake-air line 20.

The ratio $\lambda$ of the fuel injected into the cylinders to the combustion air is determined by the control unit 14 which, by suitably driving the injectors 25, sets the quantity of fuel which they release per cycle and also the quantity of fresh gas supplied to the cylinders 23. Depending on the device used for exhaust-gas aftertreatment (catalytic converter 22), the diesel engine can be operated either with substoichiometric combustion or superstoichiometric, i.e. rich combustion with excess fuel ($\lambda>1$), as is necessary, for example, for the desorption of NOx control catalytic converters. If the control unit 14 records the presence of a value, which is predetermined as a switching criterion, of an operating variable 15 of the diesel engine, the engine is switched to a special operating mode for regeneration of the catalytic converter, and a fuel/air ratio which is predetermined for this operating mode is set. To determine the switching criterion it is possible, for example, for the degree of saturation of the catalytic converter 22 to be input to the control unit as a signal 15.

Figure 2:
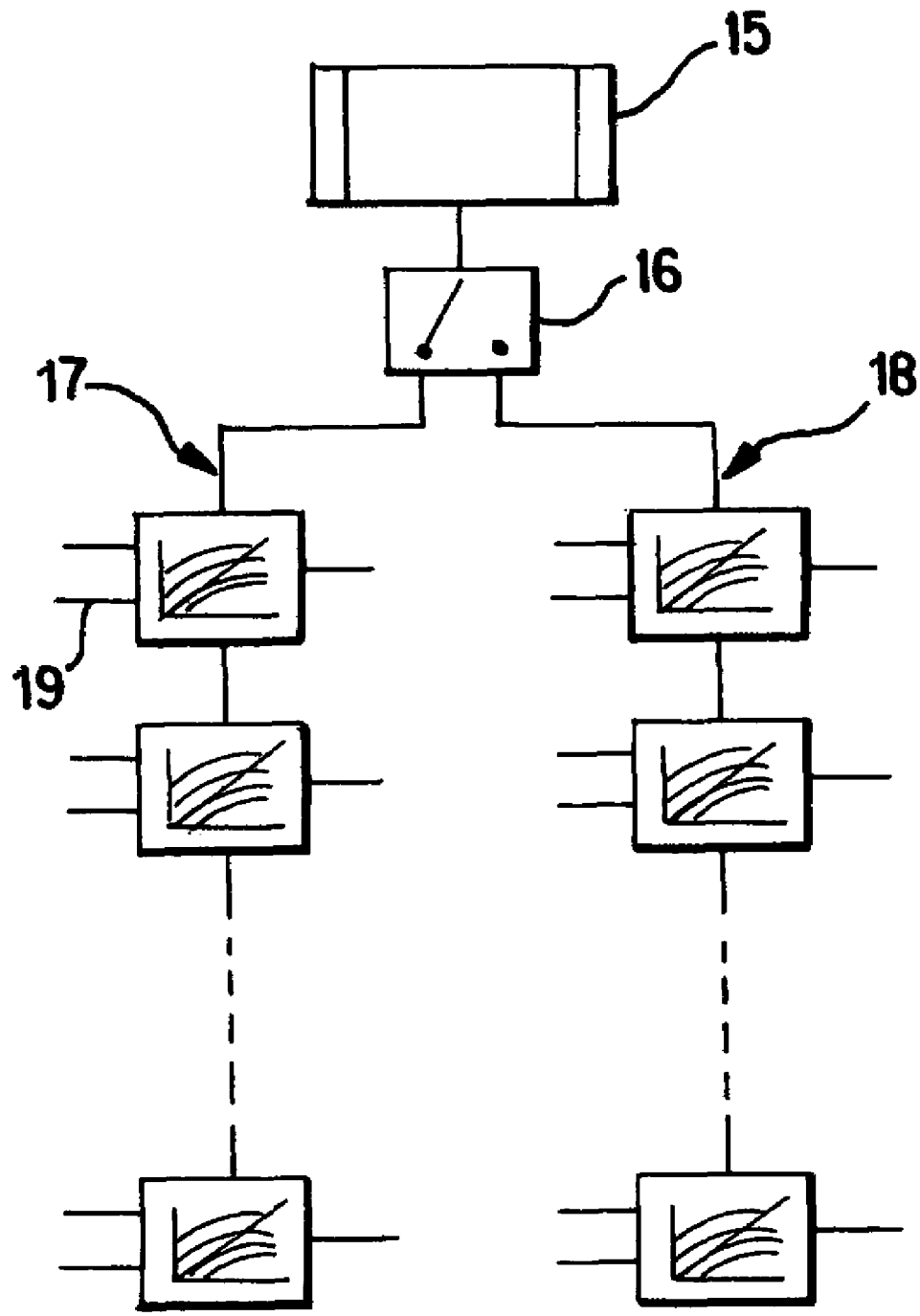
FIG. 2 shows a diagrammatic illustration of the determination of setting values in the control unit.

As is diagrammatically depicted in FIG. 2, the control unit 14 contains characteristic diagrams, with control variables as functions of continuously determined operating parameters for the actuators for setting the fuel/air ratio. The control unit has a characteristic-diagram path 17 for setting lean combustion and corresponding characteristic diagrams for all the actuators. A characteristic-diagram path 18 for setting a rich, superstoichiometric combustion includes characteristic diagrams for each actuator with corresponding control data. Depending on the measured value of the switching criterion 15 (degree of saturation of the catalytic converter), one of the characteristic-diagram paths 17, 18 is opened to be read, as diagrammatically indicated by the setting of a switch 16. During standard operation with lean combustion, the engine is switched to the special operating state when the switching criterion is present and accordingly is changed to the operating mode with rich combustion.

Each characteristic-diagram path includes a characteristic diagram with injection parameters for the injectors 25 and for each further actuator which is used by the control unit 14 to set the fuel/air ratio. Expediently, the exhaust-gas recirculation valve 2 is used in this context by the control unit 14 via a control drive 3. The exhaust-gas atmosphere for effective desorption of the catalytic converter 22 is created in the special operating mode with an afterinjection and any preinjections, the fuel which is injected at a later stage taking part in the combustion which is already taking place. The setting of the desired exhaust-gas composition is additionally influenced by suitable setting of the exhaust-gas recirculation valve. Furthermore, the control unit 14, by driving a throttle device in the intake-air line 20 and a turbocharging device in the exhaust section, influences the setting of the fuel/air ratio $\lambda$.

The throttle device may be a throttle valve 8 in the intake-air line, which is moved by the control unit 14, with a control drive 10 via a corresponding actuator 9 into the position which is determined from a characteristic diagram (FIG. 2). As an alternative to the throttle valve 8 in the intake-air line 20, a throttle member 11 can be arranged in each inlet port 24 of the cylinders 23. The control unit 14 sets all the throttle devices 11 in the inlet ports 24 via a common actuator 12 and a control drive 13 acting on the actuator 12. As a further actuator which has an effect on the fuel/air ratio, the control unit 14 acts on a turbocharging device in the exhaust section, which in the present embodiment is an exhaust-gas turbocharger 5 which comprises a turbine 27 which is acted on by the exhaust gas and a compressor 28 which acts on the fresh air. The actuator 6 of the exhaust-gas turbocharger, which can be set by the control unit via the control drive 7, may, for example, be a variably adjustable turbine geometry.

With the method according to the invention, in the special operating state, the diesel engine is operated with an afterinjection which is also burnt and follows any desired number of preinjections and one to two main injections. Furthermore, a further afterinjection, which is spaced apart in time, can be introduced into the combustion chamber. The fuel which is injected in this further afterinjection no longer participates in the combustion and contributes to the creation of an exhaust-gas atmosphere which can be purified more efficiently by the catalytic converter over a longer operating time. The afterinjection according to the invention is designed in such a way in terms of injection time and duration that superstoichiometric or substoichiometric air ratios can be created as required. The maximum pressure rise in the combustion chamber and the position of the maximum pressure rise in time approximately correspond to the values in standard operation which only involves preinjection and main injection. The engine load is controlled by the injection quantity participating in the combustion, i.e., in the special operating mode, with the inclusion of and specific attention to the afterinjection quantity which is also burnt. With the method according to the invention, it is possible to achieve higher exhaust-gas temperatures and enthalpy quickly without an increase in the amount of noise. This increases the efficiency of catalytic converters, in particular, during the warming-up phase.

The proportions of the main injection quantity and of the afterinjection quantity in the total injection quantity and the changes therein during the transition phase when changing the operating mode from rich to lean combustion and vice versa are set by the control unit as a function of one or more operating parameters 19 (FIG. 2). The following physically measurable variables are suitable as operating parameters which can be used to read the characteristic diagrams for the operating mode which is to be selected in each case:

engine torque and its derivative
engine speed and its derivative
speed of a vehicle driven by the diesel engine
drive position/gear
total injection quantity
air mass and its derivative
coolant temperature
outside air temperature
induction pipe temperature
exhaust-gas temperature
atmospheric pressure
induction-pipe pressure
exhaust-gas pressure

The invention claimed is:

1. A method for operating a diesel engine, comprising:
    switching from a standard operating mode with at least one preinjection and a main injection of fuel to a special operating mode for regeneration of an exhaust-gas aftertreatment device and setting the fuel/air ratio according to conditions in the special operating mode, when an operating variable of the diesel engine reaches a predetermined value, which is a switching criterion; and
    in the special operating mode, making at least one afterinjection of fuel, which takes place after, and is separated in time from a main injection, at a late time during the cycle such that fuel injected in the afterinjection is burnt with fuel which has previously been ignited; and
    during switching into the special operating state, increasing the quantity of fuel in the at least one afterinjection which is burnt and reducing the quantity in the main injection by a corresponding amount in subsequent cycles, until an intended afterinjection quantity is reached.

2. A method according to claim 1, further comprising metering the quantity of fuel which is burnt in the at least one afterinjection according to the operating state of the diesel engine.

3. A method according to claim 1, further comprising setting injection time for the at least one afterinjection of the fuel which is burnt according to the operating state of the diesel engine.

4. A method according to claim 1,
    further comprising setting the fuel/air ratio in accordance with the quantity of recirculated exhaust gas.

5. A method according to claim 1, further comprising adjusting each control variable as a function of the deviation throughout the entire operating range of the diesel engine.

6. A method according to claim 1, wherein, in the special operating mode, the fuel/air ratio is set according to preset values.

7. A method according to claim 1, wherein, in the special operating mode, a preinjection of fuel is performed.

8. A method according to claim 1, wherein the special operating mode pertains to the regeneration of a particle filter.

9. A method according to claim 1, wherein the special operating mode pertains to the regeneration of a $NO_x$ storage catalytic converter.

10. The method according to claim 1, further comprising controlling timing and duration of said at least one afterinjection such that a maximum pressure rise in a combustion chamber of said diesel engine during the special operation made, and timing of said maximum pressure rise, correspond approximately to maximum pressure rise and timing thereof during the standard operating mode.

11. A method according to claim 1, further comprising:
    during switching back to a standard operating state, reducing the afterinjection quantity, with a corresponding increase in the main injection quantity in subsequent cycles.

12. A method according to claim 11, further comprising setting a superstoichiometric or substoichiometric fuel/air ratio in the standard operating mode, and setting a corresponding substoichiometric or superstoichiometric fuel/air ratio in the special operating mode.

13. A method according claim 1, further comprising controlling the change in the main injection quantity and in the afterinjection quantity during the switching phase according to a control variable.

14. A method according to claim 13, wherein the control variable is an indexed torque of the diesel engine, the method further comprising keeping the indexed torque constant during the switching phase.

15. A method according claim 1, further comprising adding additional fuel to exhaust gas in order to create a desired fuel/air ratio in the exhaust gas.

16. A method according to claim 15, wherein the step of adding the additional fuel to the exhaust gas includes adding the additional fuel to the exhaust gas by making an additional afterinjection following the afterinjection of fuel which is to be burnt.

17. A method according to claim 1, further comprising controlling fresh air pressure.

18. A method according to claim 17, further comprising controlling the fresh air pressure with at least one of a throttle valves, an adjustable turbocharging device, and an exhaust-gas recirculation valve and an adjustable turbocharging device.

19. A method according to claim 17, further comprising controlling mass throughput of fresh air.

20. A method according to claim 19, further comprising controlling the mass throughput with at least one of an exhaust-gas recirculation valve taking into account a signal from an air mass flowmeter.

21. A method according to claim 19, further comprising controlling the mass throughput with a throttle member.

22. An apparatus for operating a diesel engine, comprising:
   means for switching from a standard operating mode with at least one preinjection and a main injection of fuel to a special operating mode for regeneration of an exhaust-gas aftertreatment device and setting the fuel/air ratio according to conditions in this operating mode, when an operating variable of the diesel engine reaches a predetermined value, which is a switching criterion; and
   means operable in the special operating mode, for making at least one afterinjection of fuel, which takes place after, and is separated in time from, a main injection, at a late time during the cycle such that the fuel injected in the afterinjection is burnt with fuel which has previously been ignited; and
   means operable when switching into the special operating state, for increasing the quantity of fuel in the at least one afterinjection which is burnt while at the same time reducing the quantity in the main injection by a corresponding amount in subsequent cycles, until an intended afterinjection quantity is reached.

23. An apparatus according to claim 22, further comprising, means operable when switching back to a standard operating state, for reducing the afterinjection quantity with a corresponding increase in the main injection quantity in subsequent cycles.

24. The apparatus according to claim 22, a means for increasing the quantity of fuel in the at least one afterinjection controls timing and duration of said at least one afterinjection such that a maximum pressure rise in a combustion chamber of said diesel engine during the special operation made, and timing of said maximum pressure rise, correspond approximately to maximum pressure rise and timing thereof during the standard operating mode.

* * * * *